United States Patent
Pedersen (10) Patent No.: US 10,832,544 B2
(45) Date of Patent: Nov. 10, 2020

(54) METHOD, APPARATUS AND SYSTEM FOR DETECTING METAL OBJECTS IN A DETECTION ZONE

(71) Applicant: Alert Systems ApS, Horsholm (DK)

(72) Inventor: Dennis Pedersen, Aarhus C (DK)

(73) Assignee: Alert Systems ApS, Horsholm (DK)

(*) Notice: Subject to any disclaimer, the term of this patent is extended or adjusted under 35 U.S.C. 154(b) by 0 days.

(21) Appl. No.: 16/320,912

(22) PCT Filed: Jul. 17, 2017

(86) PCT No.: PCT/EP2017/068064
§ 371 (c)(1),
(2) Date: Jan. 25, 2019

(87) PCT Pub. No.: WO2018/019647
PCT Pub. Date: Feb. 1, 2018

(65) Prior Publication Data
US 2019/0244502 A1    Aug. 8, 2019

(30) Foreign Application Priority Data

Jul. 26, 2016  (DK) .................................. 201670557

(51) Int. Cl.
*G08B 13/24* (2006.01)
*G08B 7/06* (2006.01)
(Continued)

(52) U.S. Cl.
CPC ........... *G08B 13/2471* (2013.01); *G01V 3/08* (2013.01); *G01V 3/10* (2013.01); *G01V 3/12* (2013.01); *G08B 7/06* (2013.01); *G08B 13/248* (2013.01)

(58) Field of Classification Search
CPC .... G08B 13/2471; G08B 13/248; G08B 7/06; G01V 3/10; G01V 3/08; G01V 3/12
See application file for complete search history.

(56) References Cited

U.S. PATENT DOCUMENTS 4,531,118 A * 7/1985 Beams ................. A01D 75/187
340/684
4,821,023 A * 4/1989 Parks ..................... G01V 3/107
340/516
(Continued)

FOREIGN PATENT DOCUMENTS

CN    1184547 A    6/1998
CN    1339198 A    3/2002
(Continued)

OTHER PUBLICATIONS

International Search Report and Written Opinion for PCT/EP2017/068064, dated Nov. 2, 2017.
(Continued)

*Primary Examiner* — Adnan Aziz
(74) *Attorney, Agent, or Firm* — Brinks Gilson & Lione; John C. Freeman (57) ABSTRACT

A method of detecting a metal object in a detection zone between a transmitting antenna (101) and a receiving antenna (102) installed in proximity of a revolving door (110), the method comprising: in real time: demodulating a signal received via the receiving antenna (102) to provide a first signal (y; 501); filtering the first signal (y; 501) by a first adaptive notch filter (201) to suppress at least a fundamental tone or a fundamental tone and one or more harmonic tones of the fundamental tone in a filtered signal (e; 502); and processing the filtered signal (e; 502) to detect an impulse (504), and while the impulse develops, computing a feature value of the impulse and determining whether the feature value exceeds a threshold. In case the feature value exceeds the threshold, setting a first alarm detector. In this way a so-called booster bag can be reliably detected the moment it passes the detection zone.

19 Claims, 3 Drawing Sheets

(51) Int. Cl.
*G01V 3/12* (2006.01)
*G01V 3/08* (2006.01)
*G01V 3/10* (2006.01)

(56) References Cited

U.S. PATENT DOCUMENTS

| | | | |
|---|---|---|---|
| 4,854,113 A | | 8/1989 | Strosser et al. |
| 4,878,188 A | | 10/1989 | Ziegler |
| 5,307,405 A | * | 4/1994 | Sih .................. G10L 19/012 |
| | | | 379/406.08 |
| 5,600,942 A | * | 2/1997 | Strosser ................ G01V 3/08 |
| | | | 56/10.2 J |
| 5,602,531 A | * | 2/1997 | Rude .................. G08B 13/2471 |
| | | | 340/572.4 |
| 6,351,216 B1 | | 2/2002 | Frederick et al. |
| 6,742,301 B1 | * | 6/2004 | Schwarz ................ E05G 5/003 |
| | | | 49/42 |
| 8,254,589 B2 | * | 8/2012 | Mitsuhata ............ G10K 11/178 |
| | | | 381/71.1 |
| 8,264,353 B2 | | 9/2012 | Dinh et al. |
| 8,754,771 B2 | | 6/2014 | Falkenberg et al. |
| 2004/0036606 A1 | * | 2/2004 | Frederick ............. G08B 29/18 |
| | | | 340/572.1 |
| 2011/0025498 A1 | | 2/2011 | Dinh |
| 2011/0109456 A1 | * | 5/2011 | Bergman ............ G08B 29/046 |
| | | | 340/568.5 |
| 2011/0304458 A1 | * | 12/2011 | Sayegh ................ G08B 13/248 |
| | | | 340/568.8 |
| 2012/0112918 A1 | | 5/2012 | Dinh et al. |
| 2017/0090066 A1 | * | 3/2017 | Clark ...................... G01V 3/10 |

FOREIGN PATENT DOCUMENTS

| | | |
|---|---|---|
| CN | 201489122 U | 5/2010 |
| CN | 101743572 A | 6/2010 |
| CN | 102346262 A | 2/2012 |
| CN | 103813746 A | 5/2014 |
| CN | 104990616 A | 10/2015 |
| EP | 246257 A1 | 6/2012 |
| FR | 2 614 064 A3 | 10/1988 |
| WO | WO 2013/109486 A1 | 7/2013 |

OTHER PUBLICATIONS

International Preliminary Report on Patentability for PCT/EP2017/068064, dated Jan. 29, 2019.
Danish Search Report for PA 2016 70557, dated Feb. 28, 2017.
Notice of Allowance dated Jul. 24, 2020 from corresponding Chinese Patent Application No. 201780045905.2 (four pages).
Search Report dated Feb. 28, 2020 from corresponding Chinese Patent Application No. 201780045905.2 (three pages).
Office Action dated Mar. 11, 2020 from corresponding Chinese Patent Application No. 201780045905.2 (six pages).

* cited by examiner

METHOD, APPARATUS AND SYSTEM FOR DETECTING METAL OBJECTS IN A DETECTION ZONE

RELATED APPLICATIONS

This application claims the benefit under 35 U.S.C. § 371 of the filing date of International Patent Application No. PCT/EP2017/068064, having an international filing date of Jul. 17, 2017, which claims priority to Danish Application No. DK PA201670557, filed Jul. 26, 2016, the contents of both of which are incorporated herein by reference in their entirety.

Electronic article surveillance (EAS) is a technology for preventing shoplifting from retail stores, pilferage of books from libraries or removal of properties from office buildings. Special tags are fixed to items such as merchandise e.g. clothes and books. These tags are removed or deactivated by a shop assistant when the item is properly bought or checked out. A detacher device is used to remove the tags, which may be re-usable hard tags. The type of detacher device used will depend on the type of tag. There are a variety of detachers available, with the majority using powerful magnets. At the exits of the store, a detection system sounds an alarm or otherwise alerts the staff when it senses active tags such as tags that have not been removed from an item by a detacher device.

Various types of tags exist, some of them are made of two strips; a strip of magnetostrictive, ferromagnetic amorphous metal and a strip of a magnetically semi-hard metallic material, which is used as a biasing magnet (to increase signal strength) and to allow deactivation. These strips are not bound together but free to oscillate mechanically. Amorphous metals are used in such systems due to their good magnetoelastic coupling, which implies that they can efficiently convert magnetic energy into mechanical vibrations.

The detection system for such tags emits, by a transmitting antenna, periodic tonal bursts at about 58 kHz, the same as the resonance frequency of the amorphous strip. This causes the strip to vibrate longitudinally by magnetostriction, and it continues to oscillate after the burst is over. The vibration causes a change in magnetization in the amorphous strip, which induces an AC voltage in a receiving antenna. If this signal meets the required parameters (correct frequency, repetition, etc.), an alarm is activated.

However, most EAS systems can be circumvented by placing the tagged goods in a bag, a so-called 'booster bag', which is a homemade bag lined with an aluminium or other type of metal foil.

When a tagged good is placed in a booster bag, the booster bag will act as a Faraday cage, shielding the tags from the detection system's transmitting and receiving antennas. This provides electromagnetic shielding, with the result that electronic security tags inside the bag may not be detected by security panels in the detector antennas at the store exit.

Although some vendors claim that their acousto-magnetic systems cannot be defeated by bags shielded with aluminium foil, a sufficient amount of shielding (in the order of 30 layers of standard 20 μm foil) will defeat all standard systems. The booster bag can be an ordinary shopping bag, backpack, pocketed garment, or other inconspicuous container whose inside is lined with a special material, typically multiple layers of aluminium foil.

Thus, in addition to a system for detecting such tags there is sometimes installed a detection system for booster bags. The detection systems for booster bags typically also comprise a transmitting antenna and a receiving antenna. However, since such detection systems for booster bags cannot rely on interaction with the tags, they need to be very sensitive to certain electromagnetic fields. This, however, involve complications since the detection systems (of both types) are installed next to automatic doors, often with metal parts, to cover the passage through the door opening. The automatic doors may comprise side-hinged doors, sliding doors, or revolving doors.

RELATED PRIOR ART

WO 2011/139323 A1 (Sensormatic, Inc.) discloses a system for sliding door pattern cancellation. The system attempts to reduce signal interference effects of metal doors in a metal detection system, such as a system for booster bag detection. The system includes a transmitter transmitting an interrogation signal that is used to detect transitory metal objects within the detection region, a receiver receiving instantaneous signals that represent electromagnetic field disturbances during operation of the metal detection system and include electromagnetic field disturbances attributed to the movement of metal doors. The system also includes a metal detection module that determines a resulting waveform representing the difference between the instantaneous signals received during operation of the metal detection system and a recorded pattern of signals representing electromagnetic field disturbances caused by a pattern of movement of the metal doors in the detection region when a transitory metallic object is not present. The recorded pattern is subtracted from the resulting waveform thereby attempting to leave only signals from transitory metal objects.

Thus, this system relies on the recorded pattern of signals representing electromagnetic field disturbances caused by a pattern of movement of the metal doors when a transitory metallic object is not present being a very accurate pattern. Otherwise, the—desired—signals from transitory metal objects will inevitably drown because the amplitude of the recorded signals is magnitudes larger than the amplitude of the signals from transitory metal objects.

WO 2008/125621 A1 (Alert Systems, Aps) also discloses a metal detection system, such as a system for booster bag detection. The system also includes a transmitter transmitting an interrogation signal that is used to detect transitory metal objects within the detection region and a receiver receiving instantaneous signals that represent electromagnetic field disturbances during operation of the metal detection system; wherein the electromagnetic field disturbances may include disturbances attributed to the movement of metal doors and disturbances attributed to a transitory metal object. The described system attempts to discriminate between movement of metal doors and transitory metal object—to avoid false alarms—by determining a time difference between the detection of a first signal transition and a second signal transition in the instantaneous signal. In this way, signal transitions related to door movements can be discriminated from signal transitions related to transitory metal objects from booster bags. However, it may be that determining the time difference between the detection of a first signal transition and a second signal transition in the instantaneous signal is not always possible or is not always a sufficient criterion to distinguish door movements from booster bags passing the door opening. Thus there is a risk of causing false alarms or not detecting booster bags under certain circumstances.

However, it has been observed that the prior art systems fail to reliably detect booster bags when they are installed in proximity of automatic doors such as revolving doors. A revolving door typically comprises three or four doors—denoted e.g. leaves or door leaves—mounted on a central shaft to rotate about a vertical axis within a cylindrical enclosure.

SUMMARY

When the leaves of the revolving door rotate, an oscillating signal can be observed in the signal received by the receiving antenna when it has been demodulated. The revolving door introduces an amplitude modulation which causes a much larger modulation depth than a typical booster bag. Thus it is difficult to reliably detect a booster bag when the antennas are installed in proximity of revolving doors. This observation has been used in devising:

A method of detecting a metal object in a detection zone between a transmitting antenna and a receiving antenna installed in proximity of a revolving door, the method comprising:

in real time:
demodulating a signal received via the receiving antenna to provide a first signal;
filtering the first signal by a first adaptive notch filter to suppress at least a fundamental tone or a fundamental tone and one or more harmonic tones of the fundamental tone in a filtered signal;
processing the filtered signal to detect an impulse, and while the impulse develops, computing a feature value of the impulse and determining whether the feature value exceeds a threshold; and
in case the feature value exceeds the threshold, setting a first alarm detector.

Thereby it is possible to reliably detect presence of a transiently passing metal object, such as a booster bag, in a detection zone in proximity of the revolving door even when the revolving door induces a strong distortion—which may be many times stronger than a signal, such that an impulse, caused by a booster bag or another metal or metallic object. Due to the filtering, the impulse is detectable by processing, in real time, as the booster bag passes through the detection zone. The feature value may trigger setting of the first alarm even before the impulse has faded away e.g. before it has faded below a 10% level of its peak magnitude, such as after it has reached a peak magnitude.

Since the revolving door sometimes rotates at a smooth speed and sometimes accelerates e.g. from a stand-still position, wherein the door is closed to prevent draft from the outside, the distortion that is induced in the demodulated signal may vary from an insignificant level to a significant level drowning a signal from a booster bag.

By using an adaptive filter it has been discovered that the distortion induced by the revolving door can be estimated—or mimicked—almost at the same moment as the door begins to move. Thereby compensation for the distortion can be in place before the point in time when a person with a booster bag can pass or leave the detection zone. This leads to reliably detection of a booster bag or a person carrying a booster bag.

In some aspects the adaptive notch filter processes the first signal on an ongoing basis irrespective of the revolving door moving or not. The adaptive notch filter responds to the presence of a fundamental frequency by filtering it out. However, the time it takes to respond may be very short and may cause only small remains (residuals) of the fundamental tone in the filtered signal and in this respect mainly during acceleration of the revolving door. The processing of the filtered signal to detect an impulse may be configured to forgo detecting such residuals caused as set out above or caused by higher order harmonic tones as an impulse that sets the first alarm detector. The threshold may be set to achieve this purpose.

It is appreciated that the adaptive notch filter may be configured to have a sufficiently quick impulse response that the filter is locked-in to the fundamental tone before the door has revolved 180 degrees, e.g. before the door has revolved 90 or 60 degrees.

The impulse, which may represent a transiently passing metal object, such as a booster bag, may be characterized by a peak or a plateau level following a rising/falling slope and followed by a falling/rising slope, respectively.

The feature value of the impulse may comprise one or more of: a duration of the impulse, an integral of its magnitude, a magnitude of the impulse e.g. a maximum magnitude, a first order differential quotient, and a second order differential quotient. As explained in greater detail below these feature values may be combined into an aggregated detection of whether an impulse qualifies to set the first alarm detector. The detection of whether an impulse qualifies to set the first alarm detector may be performed by a state machine.

The method set out above and below may be combined with other methods which may serve to set further conditions before an alarm is raised or to set alternative conditions for raising an alarm. The first alarm detector may directly raise an alarm such as a visual and/or audible alarm or give an input to an aggregator or arbiter that receives input from other alarm detectors and raise an alarm when a set of predefined conditions are satisfied. Such an aggregator or arbiter may evaluate the predefined conditions in a logic or probabilistic way.

In some aspects the signal received via the receiving antenna is an amplitude modulated signal. Demodulation may be amplitude demodulation.

The demodulating of the amplitude modulated signal may comprise demodulation to detect the phase and/or amplitude of a sideband signal in a sideband to a carrier wave. The sideband signal may be caused by a Doppler shift related to movement of a metal or metallic object in the detection zone.

In some aspects the method is performed at an apparatus comprising a processing module loaded with a computer program configured to perform the method as claimed in any of the preceding claims when coupled to a transmitting antenna and a receiving antenna.

In some embodiments the adaptive notch filter comprises a signal generator coupled via a gain stage to generate a desired signal which is subtracted from the first signal in order to minimize a norm of the filtered signal by adjusting the gain stage.

This type of adaptive notch filter can be configured to promptly adapt to a cyclic signal component in the first signal—such as within half a cycle or a quarter of a cycle. Thereby the door contribution can be estimated and suppressed even before a door leaf has moved 90 degrees in readiness for detecting a booster bag before the door leaf has opened a passage through the revolving door.

The signal generator may be an oscillator generating a single tone signal or a complex tone signal with an in-phase and a quadrature-phase component or a multi-tone signal such as a bandwidth-limited multi-tone signal.

In some embodiments the method comprises:
while the automatic door is moving, estimating a first frequency of a fundamental tone in the first signal;
storing a representation of the first frequency; and configuring the signal generator to generate a signal comprising a tone at the first frequency.

It is possible e.g. during an installation procedure to activate the revolving door e.g. by activating a door sensor that makes the door revolve automatically. Then, according to this embodiment of the method, a first frequency of a fundamental tone in the first signal is estimated. This frequency represents at least a portion of a signal contribution from the movement of the revolving door. A representation of this frequency is stored and then at a later point in time the adaptive notch filter uses this frequency to promptly generate a signal comprising a tone at the first frequency. In this way the signal contribution from the door can be removed promptly or quickly when the door starts to move.

The first frequency may be stored in a volatile or non-volatile memory, such that the representation of the frequency remains stored when the system is powered off. Examples of non-volatile memory are read-only memory (ROM), flash memory, and ferroelectric RAM (F-RAM). The first frequency may alternatively or additionally be stored in a volatile memory. The representation of the first frequency may be stored as a floating point number, as an integer, as a text item or in another representation. The representation may represent the frequency by its period time or fractions or multiplicities thereof.

In some embodiments the method comprises:
while the automatic door is moving, estimating a first frequency of a fundamental tone in the first signal; and
configuring an oscillator to run at the first frequency; wherein the oscillator controls the frequency of a desired signal which is subtracted from the first signal in order to minimize a norm of the filtered signal;
wherein the norm of the filtered signal is minimized by adaptively adjusting the phase and amplitude of the desired signal via an adjustable gain stage.

In aspects thereof the oscillator is configured to generate an in-phase tone signal and a quadrature-phase tone signal which are fed through a respective adjustable gain unit of the gain stage and thereafter added to form the desired signal. In this way the phase and amplitude of the desired signal can be adjusted in a flexible way.

The norm of the filtered signal may minimized by an optimization algorithm such as a gradient-descent algorithm e.g. a least-mean-squares (LMS) algorithm. The norm may be a 1-norm or 2-norm.

In some embodiments the first signal is additionally filtered by one or more second adaptive notch filters arranged in series with the first adaptive notch filter; wherein the one or more second adaptive notch filters is/are configured to suppress one or more harmonic tones of the fundamental tone in the filtered signal.

In some aspects one or more of a first harmonic tone, a second harmonic tone, a third harmonic tone, and a fourth harmonic tone are suppressed by a respective second adaptive notch filter.

In some embodiments the processing of the filtered signal to detect an impulse comprises: detecting initial phase of an impulse as the initial phase occurs and thereupon initiating the computing of the feature value; and detecting a terminal phase of the impulse as the terminal phase occurs and thereupon performing the determining of whether the feature value exceeds a threshold.

In some embodiments the processing of the filtered signal to detect an impulse is performed by means of a state machine wherein one or more of: a magnitude, a first order differential quotient, and a second order differential quotient of the first signal is/are determined and used in the state machine for transitioning the state machine from one state to another.

The advantage of using a state machine is that the impulse can be reliably detected and evaluated against predefined criteria in real time while the impulse develops—and thus while a booster bag is still in the detection zone or in close proximity thereof.

There is also provided a computer-readable medium carrying a program configured to perform the method as claimed in any of the preceding claims when the method is a computer-implemented method run on a computer.

There is also provided an apparatus with a processing module loaded with a computer program configured to perform the method as claimed in any of the preceding claims when coupled to the transmitting antenna and the receiving antenna. The filters may be implemented in the computer program and/or in hardware.

In some embodiments the apparatus comprises a processing module configured to perform electronic article surveillance by detecting an electromagnetically induced vibration in a tag via transmitting and receiving antennas.

There is also provided a system comprising a transmitter coupled to a transmitting antenna for emitting an electromagnetic interrogation signal; a receiver with a demodulator coupled to a receiving antenna; and a processor configured to:
demodulate a signal received via the receiving antenna (102) to provide a first signal (y; 501);
filter the first signal (y; 501) by a first adaptive notch filter (201) to suppress at least a fundamental tone or a fundamental tone and one or more harmonic tones of the fundamental tone in a filtered signal (e; 502);
process the filtered signal (e; 502) to detect an impulse (504), and while the impulse develops, computing a feature value of the impulse and determining whether the feature value exceeds a threshold; and
determine whether the feature value exceeds the threshold and in accordance therewith setting a first alarm detector.

The interrogation signal may be a carrier signal, such as a signal comprising one or more tones at about 20-40 KHz. The signal received via the receiving antenna may be demodulated by amplitude demodulation.

In some embodiments the system comprises one or both of a sound generator and a light source for alerting personnel people.

Here and in the following, the terms 'apparatus', 'processor', 'unit' and 'module' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

BRIEF DESCRIPTION OF THE FIGURES

A more detailed description follows below with reference to the drawing, in which.

DETAILED DESCRIPTION

Figure 1:
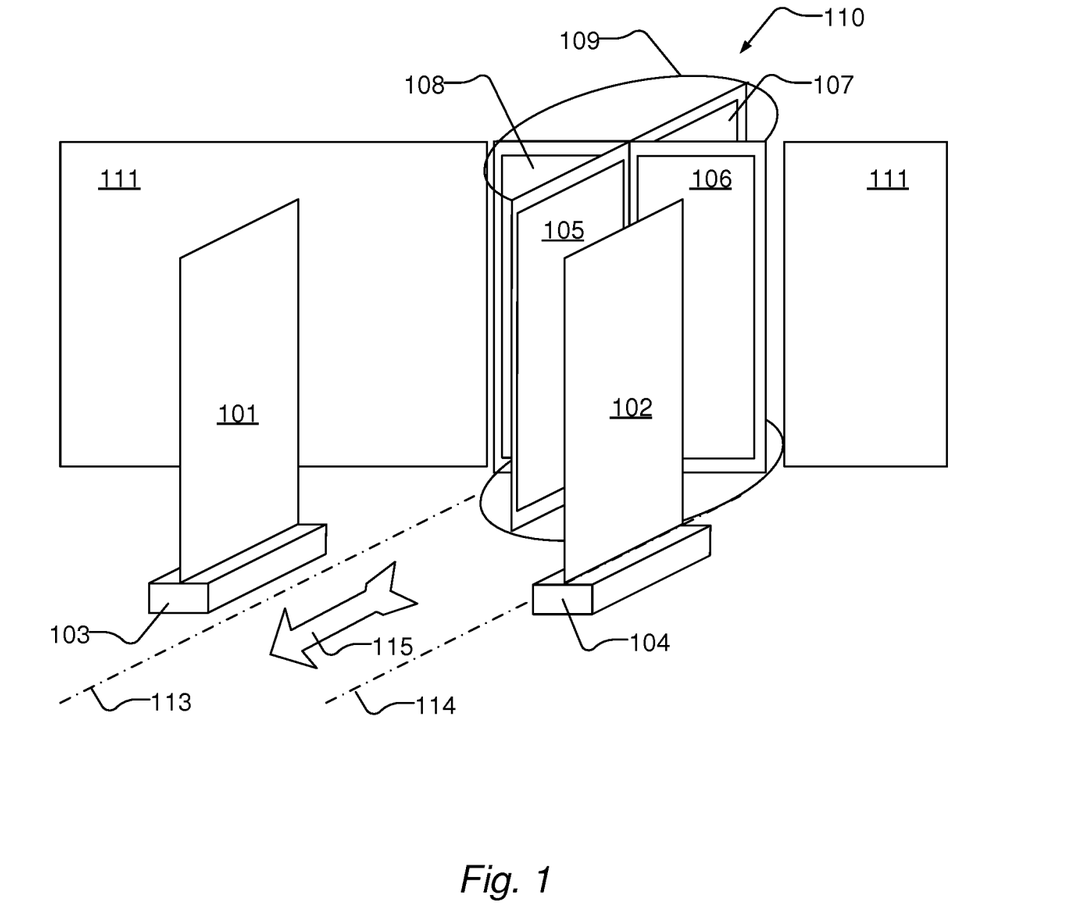
FIG. 1 shows a transmitting antenna and a receiving antenna arranged in proximity of automatic doors.

FIG. 1 shows a transmitting antenna and a receiving antenna arranged in proximity of an automatic door. The automatic door is shown as a revolving door 110. A revolving door typically consists of three or four doors (also denoted 'door panels', 'wings' or 'leaves') that hang on a central shaft and rotate about a vertical axis within a cylindrical enclosure. The 'leaves' of revolving doors usually incorporate glass, to allow people to see and anticipate each other while passing through the door, however the leaves may have a metal frame as part of its construction or functionally form a metal frame at frequencies in the range of about 20-40 KHz. The revolving door 110 comprises four leaves 105, 106, 107 and 108 in a cylindrical enclosure 109. The revolving door is installed in a wall 111, which may be a portion of a glass facade. The revolving door 110 leads to a passage as indicated by arrow 115 and dashed-dotted lines 113 and 114.

Automatic revolving doors typically have a radar sensor that detects people moving in proximity of the door and activates steady rotation of the door upon such detection for a predetermined period of time or until no people are detected in proximity of the door. Some doors are equipped with a push button that sets the rotation speed at a lower speed (e.g. to change the speed of the door from a nominal speed to half the nominal speed) giving more time for disabled people to pass through the revolving door.

In proximity of the doors, typically inside a shop, and on each side of the passage a transmitting antenna 101 and a receiving antenna 102 are installed. The transmitting antenna 101 stands on a base 103 and the receiving antenna stands on a base 104. The base 103 hosts a first electronic circuit for driving the transmitting antenna with a carrier signal at about 20-40 KHz. The base 104 hosts a second electronic circuit for demodulating the received signal, which is amplitude modulated by a metallic object passing between the antennas, and a third electronic circuit for processing the demodulated received signal to detect a metal object, such as a 'booster bag', in a detection zone in proximity of the automatic doors. The second electronic circuit is also denoted a pre-processor and the third electronic circuit is also denoted a processor.

Figure 5:
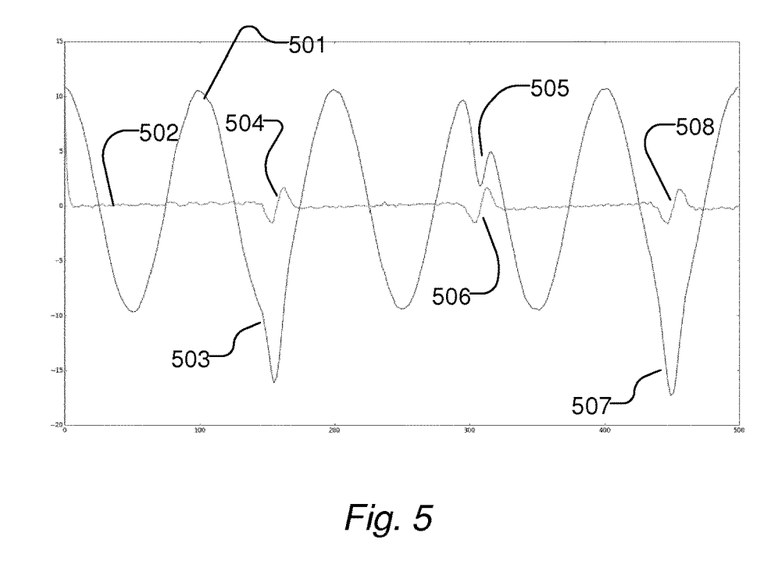
FIG. 5 shows a demodulated signal captured by a receiving antenna arranged in proximity of a revolving door.

When the leaves of the revolving door rotate, an oscillating signal can be observed in the signal received by the receiving antenna when it has been demodulated (see FIG. 5). The revolving door introduces an amplitude modulation which causes a much larger modulation depth than a typical booster bag. Thus it is difficult to reliably detect a booster bag when the antennas are installed in proximity of revolving doors.

Figure 2:
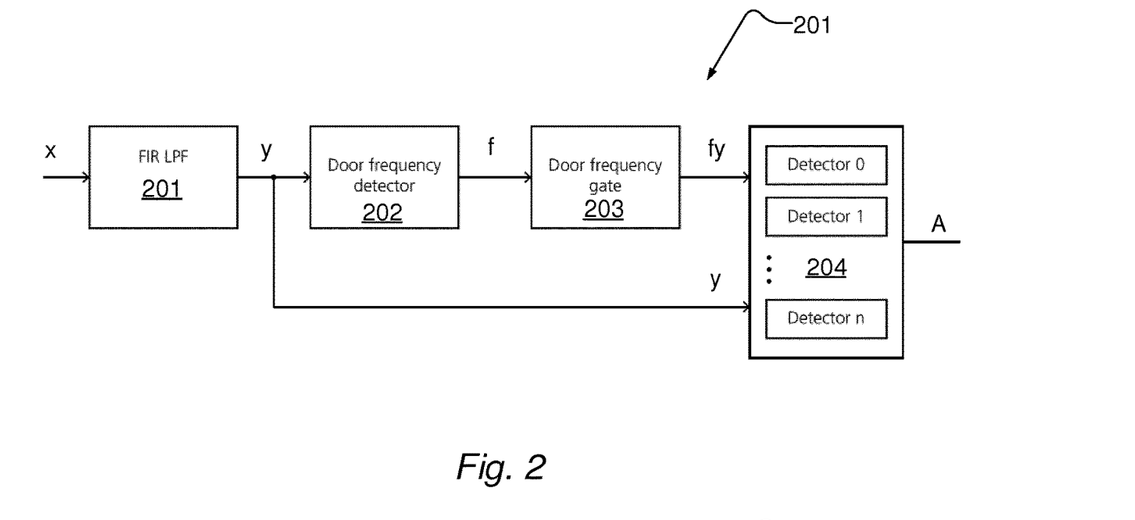
FIG. 2 shows a block diagram of a processor for detecting a metal object in a detection zone between a transmitting antenna and a receiving antenna.

FIG. 2 shows a block diagram for a processor for detecting a metal object in a detection zone between a transmitting antenna and a receiving antenna. The processor 201 receives a digital signal, x, from a pre-processor (not shown). The pre-processor is coupled to receive an analogue signal, which can be characterized as an amplitude modulated signal, from the receiving antenna and to perform demodulation and analogue-to-digital conversion to provide the digital signal, x. At least a portion of the analogue signal that is received by the receiving antenna is transmitted by the transmitting antenna that transmits a carrier signal e.g. e.g. at a frequency of about 20-40 KHz, typically 17-30 KHz, with a constant, predefined amplitude. A metal object or metallic object, such as a booster bag, passing between the transmitting and the receiving antenna modulates (changes) the amplitude of the carrier signal as received by the receiving antenna. The change may be a drop in signal strength or an increase in signal strength. A change due the presence of a booster bag may be as small as 1-2 percent or less of the predefined signal strength or amplitude.

The digital signal, x, is low-pass filtered by a FIR filter 201 with a cut-off frequency of about 3-5 Hz to provide a low-pass filtered signal 'y'. The FIR filter 201 removes noise at frequencies above the cut-off frequency. The FIR filter may be replaced by another type of filter such as an IIR filter. The cut-off frequency is selected to suppress noise, such as noise from electrical appliances, while making an effect of a booster bag remain clear and detectable. The cut-off frequency of the FIR filter 201 may be at a frequency above 3-5 Hz e.g. at a frequency below 50 Hz, e.g. below 20 Hz.

A portion of the low-pass filtered signal, y, is illustrated in FIG. 5 at reference numeral 501. The low-pass filtered signal, y, may comprise a relatively strong signal component, attributed to the rotation of a revolving door, which may be estimated by one or more of a fundamental tone and a first order harmonic tone and a second order harmonic tone; in some aspects by a fundamental tone and a first order harmonic tone or a second order harmonic tone. The low-pass filtered signal, y, may also comprise a relatively weak signal component, attributed to the presence of a booster bag or another metallic object.

The low-pass filtered signal, y, is branched to a door frequency detector 202 and a detector bank 204 with a set of detectors enumerated 'Detector 0', 'Detector 2', 'Detector n'. The door frequency detector 202 estimates the frequency of a fundamental tone in the low-pass filtered signal, y. The frequency of the fundamental tone may be estimated by averaging across multiple synchronized periods of the low-pass filtered signal, y, and then determining the time difference between a maximum magnitude and a minimum magnitude of the average which then represents or is converted to represent the frequency of the fundamental tone. The frequency of the fundamental tone is represented by a signal, f.

The signal, f, is input to a door frequency gate unit 203, which creates a new detector at the estimated frequency represented in the signal f in case a detector about that frequency doesn't exist in the detector bank 204. The door frequency gate 203 forgoes creating a new detector at the estimated frequency in case a detector at that frequency or within a range of e.g. +/−10% or +/−5% of that frequency already exists in the detector bank 204. When the processor 201 is configured for the first time or re-configured upon an operator's instructions, the revolving doors are activated to rotate (at a nominal speed) and the door frequency gate will automatically create a new detector e.g. 'Detector 0'. Some revolving doors have a push-button or other type of sensor which can be activated e.g. by disabled people to make the door revolve at a lower speed, e.g. half the speed of a nominal speed. The door frequency detector 202 estimates the corresponding fundamental frequency (when the door revolves at the lower speed) in the low-pass filtered signal, y, and the door frequency gate unit creates a new detector (e.g. 'Detector 1') at that frequency. In case the door can revolve at additional speeds additional detectors may be created. The door frequency gate 203 may create a new detector via the signal fy, which may represent the frequency of a detector to create in the detector bank 204.

As mentioned above the low-pass filtered signal, y, is branched also to the detector bank 204 and its detectors. At least one detector in the detector bank 204—in some embodiments all detectors—is/are configured with an adaptive notch filter and a pulse detector as will be explained below in greater detail. Outputs of the detectors may be in the form of a respective binary signal, wherein binary '0' indicates no alarm and binary '1' indicates alarm. These outputs may be combined into the alarm signal by an 'OR-operator' such that an alarm is given in case only one (or more) detectors indicate(s) by its output that a booster bag is detected. Outputs of the detectors may be encoded in a different way by digital discrete values or analogue signals. Combination of these signals into an alarm signal may be implemented accordingly.

The booster bag detector raises an alarm via an alarm signal designated 'A' in case a booster bag is detected. The alarm may be issued by transmitting a wired or wireless signal to a device installed at a payment desk or to a mobile device and may be given as a visual and/or audible alarm. The alarm may also be issued at the base 103 and/or the base 104 of the antennas.

Figure 3:
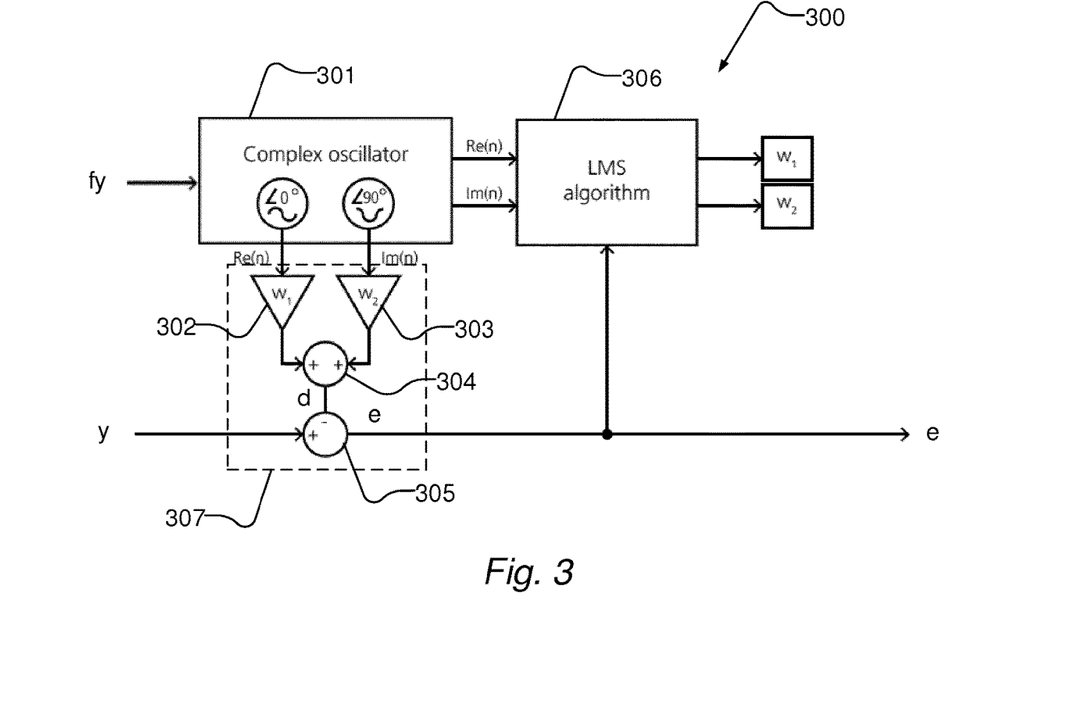
FIG. 3 shows a block diagram of an adaptive notch filter for removing a signal contribution from a revolving door.

FIG. 3 shows a block diagram of an adaptive notch filter for removing a signal contribution from a revolving door. The adaptive notch filter 300 constitutes a portion of a detector in the detector bank 204 and comprises a complex oscillator 301, an adaptation unit 306, variable gain units 302 and 303, an adder 304 and an adder 305. The variable gain units 302 and 303, the adder 304 and the adder 305 are comprised by a gain stage 307.

The complex oscillator 301 receives the signal, fy, which represents a fundamental door frequency, and generates an in-phase tone at the fundamental door frequency, Re(n), and a quadrature-phase tone at the fundamental door frequency, Im(n) shifted 90 degrees relative to each other. Via the variable gain units 302 and 303 the in-phase tone and the quadrature-phase tone are added to form a single tone signal output from the adder 304. When the variable gain units 302 and 303 are given appropriate variable gains via the adaptation unit 306 the fundamental tone in the low-pass filtered signal, y, is significantly suppressed or cancelled out in the signal, e, output from the adder 305 since the adder 305 subtracts the single tone signal output from the adder 304 from the low-pass filtered signal, y.

The adaptation unit 306 may be configured to implement or execute a Least-Mean Squares, LMS, algorithm or another gradient descent algorithm. The adaptation unit 306 receives the in-phase tone and the quadrature-phase tone from the complex oscillator 301 and the signal, e, output from the adder 305. The adaptation unit 306 adjusts the gains w1 and w2 (iteratively) of the gain units 302 and 303 in order to minimize the mean square of the signal e.

Thus, when no booster bag or other metal or metallic objects are present in the detection zone between the antennas and the revolving doors are rotating, the adaptive notch filter adjusts the gains, w1 and w2, such that the mean square of signal, e, (also denoted an error signal) ideally converges towards zero (assuming there is no noise in the system). On the contrary, if a booster bag is present in the detection zone or moves in the detection zone, the booster bag can be observed as an impulse in the signal, e. The adaptive notch filter lets a pulse (impulse) caused by a booster bag pass.

In some embodiments a single adaptive notch filter stage is sufficient for removing the signal contribution from a revolving door. That is, it is sufficient to remove a fundamental tone.

In other embodiments two, three or more adaptive notch filter stages are arranged in series to suppress or cancel not only a fundamental tone but also one or more of a first harmonic tone, a third harmonic tone and higher order harmonic tones. A first adaptive notch filter in a series of adaptive notch filters may be configured to suppress or cancel out a fundamental tone, and consecutive adaptive notch filters in the series may be configured to suppress harmonic tones in increasing order, respectively. The frequency of the harmonic tones may be computed from the frequency of the fundamental tone.

Following one or more adaptive notch filters, like the adaptive notch filter 300, contributions at one or more of a fundamental tone and one or more harmonic tones from the revolving door are suppressed in the signal, e. Signal, e, may therefore be processed to more precisely and reliably detect presence of a booster bag.

Figure 4:
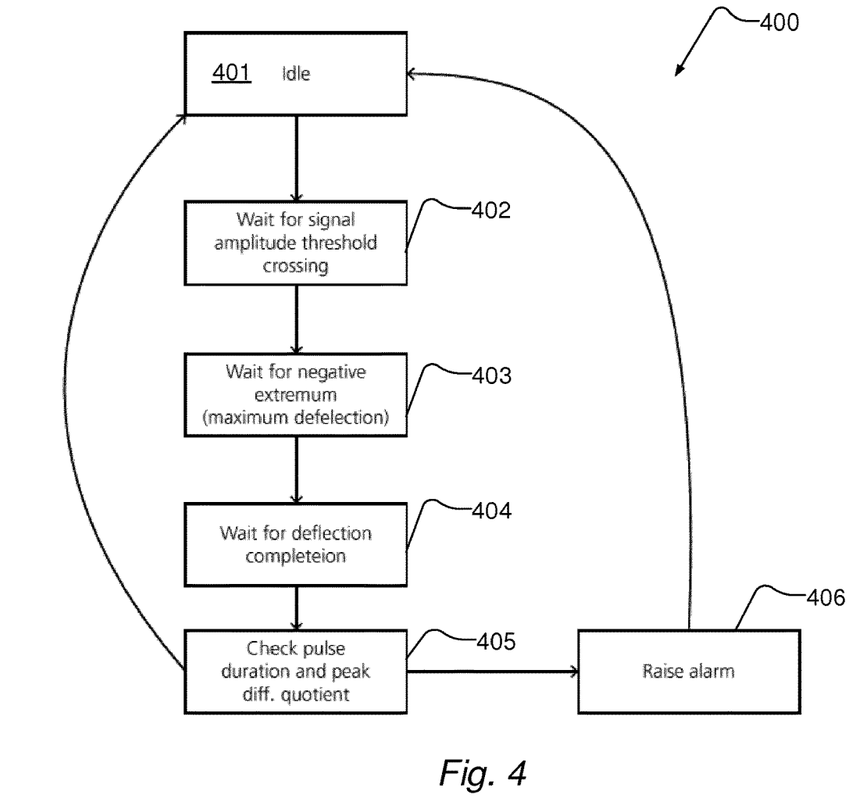
FIG. 4 shows metal detector.

FIG. 4 shows a metal detector state machine. The metal detector state machine 400 is coupled to receive the signal, e, from the adaptive notch filter 300 or series of adaptive notch filters as the case may be.

The metal detector state machine 400 receives the signal, e, and computes a first order differential quotient signal, dq, with respect to time and computes a second order differential quotient signal, ddq, also with respect to time. Such that signals e, dq and ddq are available for controlling state transitions of the state machine.

At state 401 the state machine is idle e.g. upon the state machine being powered on and transitions to state 402 in the event that the differential quotient signal dq drops below a slope threshold thereby indicating that the signal e begins to fall from a base level. In state 402 the magnitude of the signal e is registered a first time (i.e. the magnitude of the base level is registered) and a timer, which is continually incremented while the state machine is not idle is reset. The timer measures the duration of a pulse which is about to occur. Then, in the event that signal e falls below a magnitude threshold the state machine transitions from state 402 to state 403. The state machine remains in state 403 until the differential quotient signal, dq, becomes positive, which indicates that an extremum (minimum) has been reached, whereupon the magnitude of signal e is registered a second time and the difference between the magnitude of signal e measured the first time and the magnitude of signal e measured the second time is computed thereby representing the magnitude of the pulse. Then the state machine transitions to state 404 in which it remains until the second order differential quotient signal, ddq, gets negative (thereby indicating that the pulse is about to revert to the base level), whereby the state machine transitions to state 405. In state 405 the timer is read and its count indicates the duration of the pulse.

Thus, the magnitude of the pulse (impulse) and its duration is represented. These and optionally other measures may be compared against a set of criteria. In case this set of criteria are fulfilled the state machine transitions to state 406 wherein an alarm is raised. As mentioned above, the alarm may be issued by transmitting a wired or wireless signal to a device installed at a payment desk or to a mobile device and may be given as a visual and/or audible alarm. The alarm may also be issued at the base 103 and/or the base 104 of the antennas.

The above description is based on the assumption that a metal object causes a negatively going impulse, however, without departing from the principle described, the description extends to a positively going impulse with the necessary modifications.

FIG. 5 shows a demodulated signal captured by a receiving antenna arranged in proximity of a revolving door. The demodulated signal 501 may be an example of a portion of the low-pass filtered signal mentioned above. As may be seen in this time domain illustration of the magnitude of the demodulated signal 501, it can be represented by a fundamental tone (sinusoidal) and one or more harmonic tones e.g. a second harmonic or third harmonic tone.

As can be seen at points 503, 505 and 507 at respective points in time, the demodulated signal 501 comprises signal components which occur at irregular points in time. The signal components may represent a booster bag present in or passing the detection zone and deviates or stands out as a residual signal 502 when representing the demodulated signal 501 by a fundamental tone (sinusoidal) and one or more harmonic tones e.g. a second harmonic or third harmonic tone.

With respect to the adaptive notch filter described above, the residual signal 502 corresponds to the signal, e, output from an adaptive notch filter or output from a series of adaptive notch filters. In the example shown, the presence of a booster bag can be observed in the residual signal 502 as a pulse of pulse sequence 504, 506 and 508 at respective points in time.

The state machine 400 described above is configured to detect the presence of such a pulse or sequence of pulses and raise an alarm in case a pulse satisfies the criteria mentioned above.

The invention claimed is:

1. A method of detecting a metal object in a detection zone between a transmitting antenna and a receiving antenna installed in proximity of a revolving door, the method comprising:
   demodulating a signal received via the receiving antenna to provide a first signal;
   filtering the first signal by a first adaptive notch filter to suppress at least a fundamental tone or a fundamental tone and one or more harmonic tones of the fundamental tone in a filtered signal;
   processing the filtered signal to detect an impulse;
   while the impulse develops, computing a feature value of the impulse and determining whether the feature value exceeds a threshold; and
   in case the feature value exceeds the threshold, setting a first alarm detector.

2. The method according to claim 1, wherein the adaptive notch filter comprises a signal generator coupled via a gain stage to generate a desired signal which is subtracted from the first signal in order to minimize a norm of the filtered signal by adjusting the gain stage.

3. The method according to claim 2, comprising:
   while the revolving door is moving, estimating a first frequency of a fundamental tone in the first signal;
   storing a representation of the first frequency; and
   configuring the signal generator to generate a signal comprising a tone at the first frequency.

4. The method according to claim 1, comprising:
   while the revolving door is moving, estimating a first frequency of a fundamental tone in the first signal; and
   configuring an oscillator to run at the first frequency;
   wherein the oscillator controls the frequency of a desired signal which is subtracted from the first signal in order to minimize a norm of the filtered signal;
   wherein the norm of the filtered signal is minimized by adaptively adjusting the phase and amplitude of the desired signal via an adjustable gain stage.

5. The method according to claim 1, wherein the first signal is additionally filtered by one or more second adaptive notch filters arranged in series with the first adaptive notch filter; wherein the one or more second adaptive notch filters is/are configured to suppress one or more harmonic tones of the fundamental tone in the filtered signal.

6. The method according to claim 1, wherein the processing of the filtered signal to detect an impulse comprises:
   detecting an initial phase of an impulse as the initial phase occurs and thereupon initiating the computing of the feature value;
   detecting a terminal phase of the impulse as the terminal phase occurs; and
   performing the determining of whether the feature value exceeds a threshold.

7. The method according to claim 6, wherein the processing of the filtered signal to detect an impulse is performed by means of a state machine wherein one or more of: a magnitude, a first order differential quotient, and a second order differential quotient of the first signal is/are determined and used in the state machine for transitioning the state machine from one state to another.

8. The method according to claim 1, wherein the metal object is a metal foil that forms at least a part of a bag.

9. The method according to claim 2, wherein the first signal is additionally filtered by one or more second adaptive notch filters arranged in series with the first adaptive notch filter; wherein the one or more second adaptive notch filters is/are configured to suppress one or more harmonic tones of the fundamental tone in the filtered signal.

10. The method according to claim 2, wherein the processing of the filtered signal to detect an impulse comprises:
    detecting initial phase of an impulse as the initial phase occurs and thereupon initiating the computing of the feature value;
    detecting a terminal phase of the impulse as the terminal phase occurs; and
    performing the determining of whether the feature value exceeds a threshold.

11. The method according to claim 2, wherein the metal object is a metal foil that forms at least a part of a bag.

12. The method according to claim 3, wherein the first signal is additionally filtered by one or more second adaptive notch filters arranged in series with the first adaptive notch filter; wherein the one or more second adaptive notch filters is/are configured to suppress one or more harmonic tones of the fundamental tone in the filtered signal.

13. The method according to claim 3, wherein the processing of the filtered signal to detect an impulse comprises: detecting initial phase of an impulse as the initial phase occurs and thereupon initiating the computing of the feature value; detecting a terminal phase of the impulse as the terminal phase occurs and thereupon performing the determining of whether the feature value exceeds a threshold.

14. The method according to claim 3, wherein the metal object is a metal foil that forms at least a part of a bag.

15. A non-transitory computer-readable medium carrying a program configured to perform a method, when run on a computer, of detecting a metal object in a detection zone between a transmitting antenna and a receiving antenna installed in proximity of a revolving door, the method comprising:

demodulating a signal received via the receiving antenna to provide a first signal;

filtering the first signal by a first adaptive notch filter to suppress at least a fundamental tone or a fundamental tone and one or more harmonic tones of the fundamental tone in a filtered signal;

processing the filtered signal to detect an impulse;

while the impulse develops, computing a feature value of the impulse and determining whether the feature value exceeds a threshold; and in case the feature value exceeds the threshold, setting a first alarm detector.

16. An apparatus comprising:

a transmitting antenna;

a receiving antenna, wherein the transmitting antenna and the receiving antenna are installed in proximity of a revolving door for detecting a metal object in a detection zone between the transmitting antenna and the receiving antenna; and a processing module loaded with a computer program configured to perform a method when coupled to the transmitting antenna and the receiving antenna, wherein the method comprises:

demodulating a signal received via the receiving antenna to provide a first signal;

filtering the first signal by a first adaptive notch filter to suppress at least a fundamental tone or a fundamental tone and one or more harmonic tones of the fundamental tone in a filtered signal;

processing the filtered signal to detect an impulse;

while the impulse develops, computing a feature value of the impulse and determining whether the feature value exceeds a threshold; and     in case the feature value exceeds the threshold, setting a first alarm detector.

17. The apparatus according to claim 16, wherein the processing module is configured to perform electronic article surveillance by detecting an electromagnetically induced vibration in a tag via the transmitting antenna and the receiving antenna.

18. A system comprising:

a transmitter coupled to a transmitting antenna for emitting an electromagnetic interrogation signal;

a receiver with a demodulator coupled to a receiving antenna, wherein the transmitting antenna and the receiving antenna are installed in proximity of a revolving door for detecting a metal object in a detection zone between the transmitting antenna and the receiving antenna;

a processor configured to:

demodulate a signal received via the receiving antenna to provide a first signal;

filter the first signal by a first adaptive notch filter to suppress at least a fundamental tone or a fundamental tone and one or more harmonic tones of the fundamental tone in a filtered signal;

process the filtered signal to detect an impulse;

while the impulse develops, computing a feature value of the impulse and determining whether the feature value exceeds a threshold; and     determine whether the feature value exceeds the threshold and in accordance therewith setting a first alarm detector.

19. The system according to claim 18, comprising one or both of a sound generator and a light source for alerting personnel people.

* * * * *